(12) United States Patent  
Mahlanen et al.

(10) Patent No.: US 7,866,161 B2
(45) Date of Patent: Jan. 11, 2011

(54) METHOD OF OPERATING A GAS ENGINE PLANT AND FUEL FEEDING SYSTEM FOR A GAS ENGINE

(75) Inventors: Timo Mahlanen, Helsinki (FI); Sören Karlsson, Solf (FI)

(73) Assignee: Wärtsilä Finland Oy, Vaasa (FI)

( * ) Notice: Subject to any disclaimer, the term of this patent is extended or adjusted under 35 U.S.C. 154(b) by 109 days.

(21) Appl. No.: 11/909,192

(22) PCT Filed: Mar. 1, 2006

(86) PCT No.: PCT/FI2006/050087

§ 371 (c)(1),
(2), (4) Date: Aug. 26, 2009

(87) PCT Pub. No.: WO2006/100342

PCT Pub. Date: Sep. 28, 2006

(65) Prior Publication Data

US 2009/0314227 A1    Dec. 24, 2009

(30) Foreign Application Priority Data

Mar. 24, 2005   (FI) .................................. 20055137

(51) Int. Cl.
F02C 6/18 (2006.01)

(52) U.S. Cl. ...................................... 60/780; 60/39.12

(58) Field of Classification Search ............... 60/39.12, 60/39.53, 39.55, 772, 775, 780, 781
See application file for complete search history.

(56) References Cited

U.S. PATENT DOCUMENTS

| | | | | |
|---|---|---|---|---|
| 3,992,876 A | * | 11/1976 | Aguet | 60/39.12 |
| 4,147,142 A | | 4/1979 | Little et al. | |
| 5,775,308 A | | 7/1998 | Headley et al. | |
| 6,098,396 A | * | 8/2000 | Wen et al. | 60/777 |
| 2003/0168381 A1 | * | 9/2003 | Hokari et al. | 208/106 |

FOREIGN PATENT DOCUMENTS

| | | |
|---|---|---|
| DE | 3607007 | 9/1987 |
| GB | 669759 | 4/1952 |

* cited by examiner

Primary Examiner—Louis Casaregola
(74) Attorney, Agent, or Firm—Chernoff, Vilhauer, McClung & Stenzel

(57) ABSTRACT

A gas engine plant that includes a combustion engine adapted to combust gaseous fuel receives fuel containing hydrocarbons, reforms the fuel by cracking the heavier hydrocarbons in the fuel while minimizing cracking of methane, and feeds the reformed fuel in gaseous form to the combustion engine.

Figure 1:
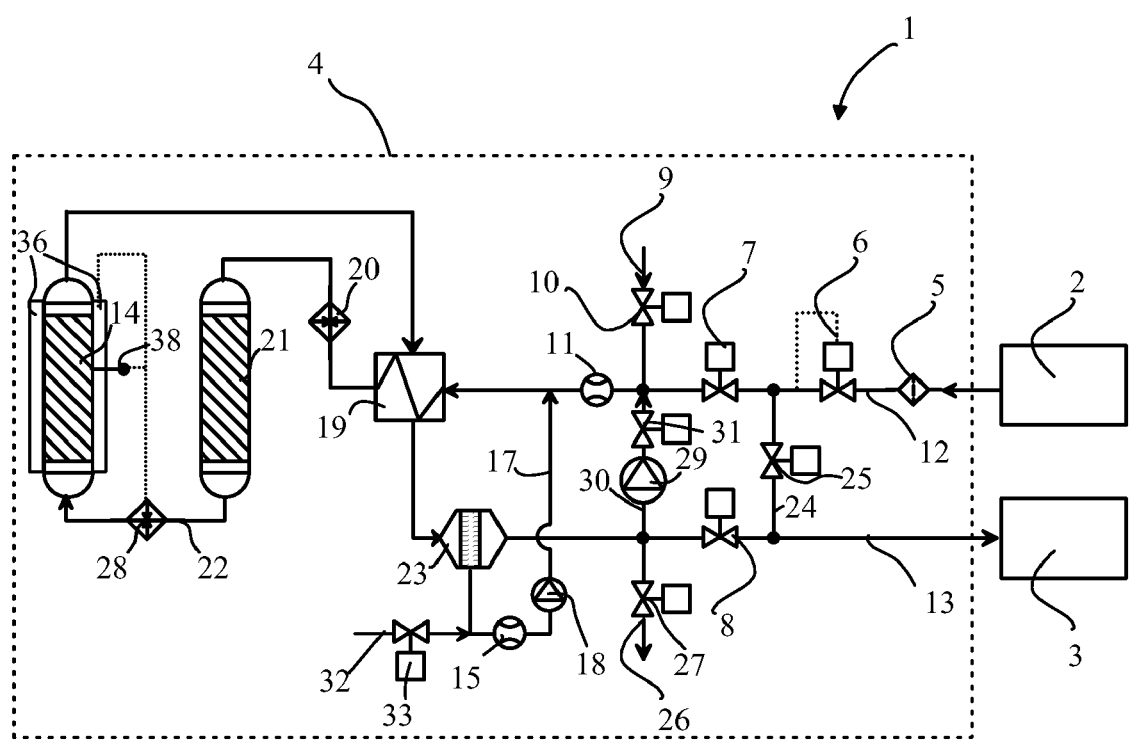

8 Claims, 2 Drawing Sheets

METHOD OF OPERATING A GAS ENGINE PLANT AND FUEL FEEDING SYSTEM FOR A GAS ENGINE This is a national stage application filed under 35 USC 371 based on International Application No. PCT/FI2006/050087 filed Mar. 1, 2006, and claims priority under 35 USC 119 of Finnish Patent Application No. 20055137 filed Mar. 24, 2005.

The invention relates to method of operating gas engine plant. The invention also relates to fuel feeding system of a gas engine.

Raw natural gas is often the only feasible fuel available to operate power generators and compressor stations in remote locations and on offshore platforms. In many cases, the gas contains unacceptable levels of heavier hydrocarbons. Use of this untreated gas in piston engines and gas turbines causes operating problems. The knock resistance of gaseous fuels is often evaluated by the methane number. In gas engines with high compression ratio and therefore also high thermal efficiency, heavy hydrocarbons constituents in the gaseous fuel will lead to a reduced methane number. In many cases gas engines running directly on the gas fuel available can often not produce as high output as desired in gas operating mode due to too low methane number of the gas mixture. In case that a gas engine is requested to be loaded above the output limited by the methane number, it will start knocking and the output has to be reduced.

Also in gas turbines the gas to be used must be set and taken into account at designing stage. In case the gas turbine has been designed to be operated with e.g. methane, using of gas containing heavier hydrocarbons is problematic.

Another problem which relates to prior art particularly in connection with oil drilling rigs, that is it would be advantageous to utilize certain liquid fuels which presently are of no feasible use, like gas condensates. It would be beneficial to be able to operate combustion engines originally designed to run with gas, also with liquid fuels, like gas condensate obtained in oil drilling process. Normally this is not possible without changes in the construction of the engine, which can not be done each time when different fuel should be used.

It is an object of the invention to provide a method of operating gas engine plant in which the performance of the engine is maintained at proper level even with fuel containing heavier hydrocarbons, and even run a gas engine by making use of liquid fuel. It is also an object of the invention to provide a fuel feeding system of a gas engine which provides high fuel with high methane number for the gas engine in simple and easily controllable manner.

In connection with this specification the phrase "gas engine" means generally gas operated combustion engine. With wording "heavier hydrocarbons" it is meant hydrocarbons which are heavier than methane, $CH_4$.

According to the invention method of operating a gas engine plant comprising a combustion engine adapted to combust gaseous fuel and a fuel feeding system with a source of fuel, comprises at least a step of cracking heavier hydrocarbons in the fuel prior to feeding the fuel into the gas engine in a reformer unit provided in a fuel feeding system of the gas engine. In this manner the quality of the fuel fed to the engine may be maintained at acceptable level even if the fuel originally would include heavy hydrocarbons. In piston engines this means that power output i.e. loading of the engine may be kept at high level without a risk of knocking. Also, the present invention makes it possible to use fuel containing heavier hydrocarbons e.g. in gas turbine designed solely for methane as fuel.

Preferable the cracking reactions are controlled so that the heavier hydrocarbons in the fuel are cracked while minimizing cracking of methane. This may be accomplished so that water amount depending on the fuel composition, flow rate, and the reformer unit, is arranged to be present at the reactions, as well as so that temperature of the reformer unit determined for each case is maintained at the reactor unit. In practice the cracking of the heavier hydrocarbons is mainly controlled based on temperature control of the reformer unit. Typically temperature is maintained below 450° C. in the reformer unit.

It is further advantageous that the fuel, before entering the reformer unit, is heated by transferring heat from the fuel coming out from the reformer unit. This increases energy efficiency of the process.

According to a specific embodiment of the invention the source of fuel is liquid fuel and the liquid fuel is evaporated prior to feeding into the reformer unit with heat transferred from the fuel coming out from the reformer unit. Making use of this embodiment a gas engine may be even operated with originally liquid fuel and also with efficient manner.

Fuel feeding system of a gas engine according to the invention comprises a supply line for delivering fuel to the gas engine, and the gas engine wherein the supply line is provided with a fuel reformer unit for cracking the heavier hydrocarbons in the fuel prior to feeding to the gas engine.

The supply line comprises a first supply line leading from the source of fuel to a reformer unit and a second supply line leading from the reformer unit to the gas engine and the first and the second supply line are provided with a common heat exchanger in which fuel in the first supply line is heated by transferring heat from the fuel in the second supply line. Preferably the fuel reformer unit is provided with temperature controlling device by means of which the temperature in the reformer unit may be maintained at a level which results in cracking of the heavier hydrocarbons while minimizing the cracking of methane.

The actual operating parameters for the reformer unit are determined always according to used gas and type of reformer in question.

Figure 2:
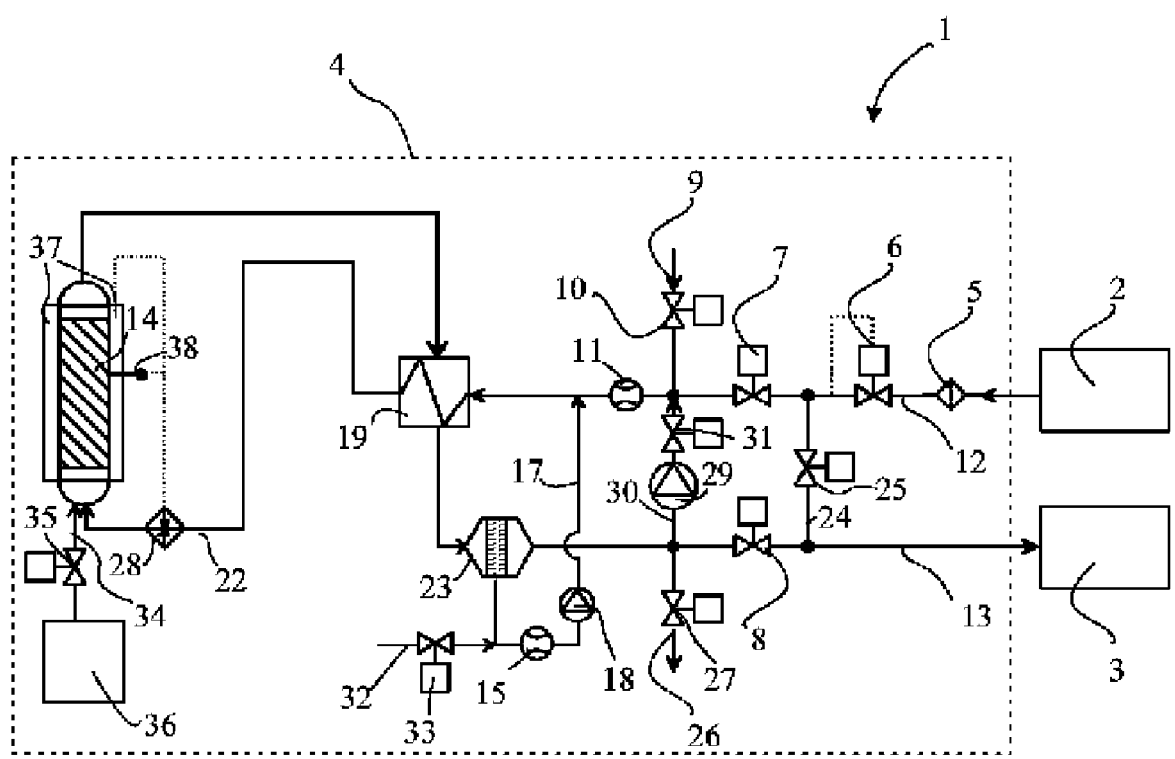

In the following, the invention is explained in an exemplary way, with reference to the appended schematic drawings, in which FIG. 1 is an illustration of an embodiment applying the fuel feeding system according to the invention to a gas engine plant, and FIG. 2 is an illustration of an other embodiment applying the fuel feeding system according to the invention to a gas engine plant.

FIG. 1 schematically shows a gas engine plant 1 including a source of fuel 2 and a gas engine 3 as well as a fuel refining unit 4. The gas engine may be e.g. a gas operated piston engine or a gas turbine. Both types of the combustion engines are applicable in connection with the invention.

The fuel refining unit 4 comprises firstly a filter element 5 provided in a first supply line 12 leading from the source of fuel 2 to a reformer unit 14. The filter unit 5 is provided for separating particles and other solid impurities from the fuel stream. After the filter unit 5 in the fuel flow direction there is a pressure control valve 6 in the first supply line 12. The pressure control valve 6 controls the pressure of the fuel refining unit, which is, when connected to a piston engine, typically approximately 8 bar. The valve 6 is preferably also provided with a safety shut-off valve built into the valve for closing valve outlet in case of a malfunction of the valve 6.

There is also a shut-off valve 7 in the first supply line and a shut-off valve 8 in the second supply line 13 for separating the fuel refining unit 4 from the system in special cases, like maintenance. Also, before the start up and before maintenance work may be commenced the unit 4 should be made inert, which may be accomplished with a valve 10 and an inlet for inert gas 9, connected here to the first supply line 12 at location after the shut off valve 7. The inert gas may be for example nitrogen. Naturally before starting the maintenance procedures the shut off valves 7, 8 are also closed. The first and the second supply lines may be connected with each other and bypass the refining unit 4 by means of the bypass duct 24. The bypass duct is also provided with a shut off valve 25. It connects the first and the second supply lines at engine/fuel source side of the shut-off valves 7 and 8.

The fuel refining unit 4 is preferably provided with a flow meter 11 for example in order to be able to adjust a proper carbon/steam ratio in the process. There is also another flow meter 15 provided in a recycle duct 17. In the recycle duct there is also a high pressure pump 18 for injecting water in the first supply line 12. The recycle duct 17 connects a droplet separator 23 provided in the second supply line 13 to the first supply line 12 at a location after the flow meter 11. The droplet separator is positioned in the second supply line 13 after a heat exchanger 19, which is connected to the first and second supply lines 12, 13.

In case the fuel is gaseous the heat exchanger 19 is for heating the gas flowing in the first supply line 12 and cooling the gas in the second supply line 13. In case the refining unit 4 and the combustion engine 3 are used with originally liquid fuel the heat exchanger 19 also evaporates the fuel into gaseous form and heats it and simultaneously cools down the gas coming from the reformer unit 14 on the other side of the heat exchanger 19.

Additionally, the first supply line 12 is provided with an additional heater 20, like electrical heater for heating the gas to proper temperature before feeding into a sulphur absorber unit 21 provided in the first supply line 12. The sulphur absorber may be needed in case the sulphur content of the fuel is greater than accepted by the reformer unit 14. Here the sulphur absorber is connected with the reformer unit 14 via a connection line 22. Typically the operation of a steam reformer i.e. reformer in which the reactions of hydrocarbons takes place with water is sensitive to the existence of sulphur. The connection line is in this case also provided with an additional heater 28. It should be noted that all commercially available catalysts feasible for reformer unit do not need complete removal of sulphur from the fuel.

The operation of refining unit 4 is described in the following. Before the start up the unit 4 is made inert by making use of nitrogen, which is fed through the inlet 9 and the valve 10. The shut off valves 7 and 8 are closed and a vent valve 27 in the vent duct 26 is opened. Nitrogen is led through the system by opening valve 10. When all oxygen has been flushed from the system, the vent valve 27 is closed and the system is pressurized for example as explained in following.

A circulation fan 29 in an intermediate duct 30 connecting the first supply line 12 and the second supply line 13 is started and the valve 31 is opened. This way by circulating the nitrogen through the electrical heater(s) 20, 28 the refining unit 4 and the reformer unit 14 as well are heated to operating conditions. As the temperature increases, the pressure will increase accordingly. When the operating conditions have been reached, the high pressure pump 18 will be started to inject water into the nitrogen gas flow according to a preprogrammed C/S (=carbon/steam) ratio (control equipment not shown). C/S ratio is depending on fuel contents and flow rate and it is determined beforehand separately for each case. At least during the start up the water may be introduced into the unit via a water inlet (not shown) provided e.g. in connection with the recycle duct 17. This also depends on the type of used reformer unit 14. When both the sulphur absorber and the reformer reactor have been flushed through with humid nitrogen, the system is ready for operation. During a normal operation the bypass duct 24 is closed by shut off valve 25.

When the fuel refining unit 4 is in normal operation liquid fuel or gas containing heavy hydrocarbons from a fuel source 2 is first filtered in the filter unit 5. After that the fuel is fed into the heat exchanger 19 where it is heated with gas already reformed. It is possible to add water into the fuel stream if needed for obtaining a desired carbon/steam ratio in the reformer unit 14 for example through makeup water inlet 32 controlled by valve 33. In case liquid fuel is used as source it is evaporated in the heat exchanger and additionally heated. Now, gaseous fuel after the heat exchanger in the first supply line 12 is heated up to about 300§C being proper temperature for sulphur removal unitÿ21.

After possible sulphur has been removed from the gas it is fed to the reformer unit 14. In the reformer unit the reactions are controlled by maintaining proper temperature therein. For this purpose the reformer unit 14 is provided with heater 37, which may be for example electric heater. The operation of the heater 37 is controlled based on temperature measurement probe 38. It is also possible to use the additional heater 28 based on temperature measurement probe 38 in connection with the reformer unit 14. It is important that the temperature is maintained at a level which will produce only cracking of heavier hydrocarbons in the fuel, while minimizing the cracking of methane. The proper temperature depends on e.g. the actual catalyst used in the reformer unit 14 and on gas composition.

After the reformer unit 14 the gas is cooled down and the humidity condensed in the heat exchanger 19 at downstream side of the reformer. The water droplets are separated and re-injected into the inlet fuel flow.

In case the reformer unit is of a type requiring hydrogen present at the reactions, a part of the processed gas will be re-circulated via the intermediate duct 30 and circulation fan 29 back to the first feed duct 12.

In FIG. 2 there is shown another embodiment applying the fuel feeding system according to the invention to a gas engine plant. It is mostly identical to the one shown in FIG. 1 with corresponding reference numbers, but has another type of reformer unit 14. In this case the reformer unit is a so called auto thermal reformer (ATR), the control of which is in some cases gives advantages. ATR type reformer unit 14 is provided with an air introducing duct 34 provided with a control valve 35 and being in connection with a source of pressurized air 36. In ATR it is possible to provide necessary water (steam) into the cracking reactions by controlling the amount of air (or $O_2$) introduced. By introducing air (or $O_2$) some of the gas will combust in the reformer unit 14 producing heat and water (steam). This is beneficial because typically the heavier hydrocarbons are the components which are firstly reacting with the oxygen in the air. This way both the adding of steam and controlling the temperature in the reformer unit 14 may by accomplished by air introduction with ATR reformers.

The invention is not limited to the embodiments described here, but a number of modifications thereof can be conceived of within the scope of the appended claims. For example instead of steam reformer also other types of cracking devices may be utilized. Reformer unit may be formed of several individual units when they can be operated in different manner for obtaining proper gas properties at the end.

The invention claimed is:

1. A method of operating a gas engine plant comprising a combustion engine adapted to combust gaseous fuel, said method comprising:
   receiving fuel containing hydrocarbons,
   reforming the fuel by cracking the heavier hydrocarbons in the fuel in a reformer unit while minimizing cracking of methane,
   heating fuel entering the reformer unit by transfer of heat from fuel leaving the reformer unit, and
   feeding the reformed fuel in gaseous form to the combustion engine.

2. A method according to claim 1, comprising controlling the cracking of the heavier hydrocarbons based on temperature of the reformer unit.

3. A method according to claim 1, comprising maintaining the reformer unit at a temperature below 450° C.

4. A method according to claim 1, wherein the fuel is liquid fuel and heating fuel entering the reformer unit evaporates the liquid fuel.

5. A method according to claim 1, comprising introducing water required for cracking reaction into the fuel prior to entering the reformer unit.

6. A method according to claim 1, comprising producing water required for cracking reaction in the reformer unit by oxidation reactions of heavier hydrocarbons.

7. A gas engine plant comprising:
   a combustion engine adapted to combust gaseous fuel, and
   a fuel feeding system for receiving fuel containing hydrocarbons and delivering fuel in gaseous form to the combustion engine, wherein the fuel feeding system comprises a reformer for reforming the fuel by cracking hydrocarbons heavier than methane, a first fuel supply line leading from a source of fuel to the reformer, and a second supply line leading from the reformer to the combustion engine, and wherein the first and second supply lines are provided with a common heat exchanger whereby fuel in the first supply line is heated by transfer of heat from fuel in the second supply line.

8. A gas engine plant according to claim 7, comprising a temperature controlling device for maintaining the reformer at a proper temperature for cracking the heavier hydrocarbons and minimizing cracking of methane.

* * * * *